(12) United States Patent
Neland

(10) Patent No.: US 10,248,716 B2
(45) Date of Patent: Apr. 2, 2019

(54) REAL-TIME GUIDANCE FOR CONTENT COLLECTION

(71) Applicant: Accenture Global Solutions Limited, Dublin (IE)

(72) Inventor: Joshua Neland, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 462 days.

(21) Appl. No.: 15/048,664

(22) Filed: Feb. 19, 2016

(65) Prior Publication Data
US 2017/0242920 A1   Aug. 24, 2017

(51) Int. Cl.
| | | |
|---|---|---|
| G06F 17/00 | (2006.01) | |
| G06F 17/30 | (2006.01) | |
| G06N 99/00 | (2019.01) | |
| G06N 7/00 | (2006.01) | |
| G06Q 10/06 | (2012.01) | |
| G06Q 40/08 | (2012.01) | |

(52) U.S. Cl.
CPC .... G06F 17/30687 (2013.01); G06F 17/3064 (2013.01); G06N 7/005 (2013.01); G06N 99/005 (2013.01); G06Q 10/06 (2013.01); G06Q 40/08 (2013.01)

(58) Field of Classification Search
CPC ............. G06F 17/30867; G06F 3/0482; G06F 17/30864; G06F 17/30312; G06F 17/00
See application file for complete search history.

(56) References Cited

U.S. PATENT DOCUMENTS

| | | | |
|---|---|---|---|
| 5,084,819 A | 1/1992 | Dewey et al. | |
| 6,631,370 B1 | 10/2003 | Pekkanen | |
| 7,083,103 B2 | 8/2006 | Hull | |
| 2005/0131952 A1 | 6/2005 | Ito | |
| 2007/0020602 A1 | 1/2007 | Torrance et al. | |
| 2007/0105074 A1 | 5/2007 | Maslen et al. | |
| 2011/0314007 A1* | 12/2011 | Dassa ............... | G06F 17/30893 707/723 |
| 2015/0186537 A1 | 7/2015 | Liu et al. | |
| 2015/0363365 A1* | 12/2015 | Campbell ............. | G06F 3/0412 345/173 |

* cited by examiner

*Primary Examiner* — Truong V Vo
(74) *Attorney, Agent, or Firm* — Fish & Richardson P.C.

(57) ABSTRACT

Methods, systems, and apparatus, including computer programs encoded on computer storage media, for providing real-time guidance for content collection. One of the methods includes receiving user input from a user through a user interface presentation, determining, from the received user input using a first model, one or more provided data elements occurring in the user input, determining, from the one or more provided data elements occurring in the user input using a second model, one or more intended tasks, determining, for each intended task of the one or more intended tasks using a third model, one or more suggested data elements, ranking the one or more suggested data elements, and updating the user interface presentation with a user interface element suggesting that the user provide the one or more needed data elements.

24 Claims, 4 Drawing Sheets

REAL-TIME GUIDANCE FOR CONTENT COLLECTION

FIELD

The present specification relates to machine learning for content collection.

BACKGROUND

Machine learning refers to techniques for using computing systems to train predictive models that use past training examples to predict the outcome of future events that are similarly situated as the training examples. For example, machine learning can be used to train a predictive model, or for brevity, model, that predicts the market value of a house given particular attributes of the house, e.g., square footage, ZIP code, etc. The attributes are referred to as features of the model. A collection of features associated with a single data point used to train the model is referred to as a training example.

Many large enterprises and government institutions utilize machine learning to generate predictions of many different types of phenomena, e.g., oil demand for a particular region, the incidence rate of the flu virus in January, and the likelihood that a prospective borrower is likely to default on a mortgage.

Many of such organizations rely on users to manually enter information for completing a particular intended task. Such data entry is often cumbersome and inefficient. For example, user interfaces that use forms are tedious and often overly rigid. On the other hand, unstructured text fields give little or no guidance for what data is required for a particular task.

SUMMARY

This specification describes how a system can provide real-time guidance for unstructured content collection.

Particular embodiments of the subject matter described in this specification can be implemented so as to realize one or more of the following advantages. Users can more easily formulate documents and other unstructured text that comprehensively addresses every piece of information that the respective text is intended to convey. The system provides for a more open-ended information collection process that does not constrain users to rigid forms and standard documents having strict structure. Such suggestions can be provided in real-time as the user is entering text. A user is interactively informed about remaining steps that the user must take in order to complete an intended task.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

This specification describes a content collection guidance system that operates in real-time to provide suggestions to a user about new pieces of content to be added to unstructured text being entered by the user.

Figure 1:
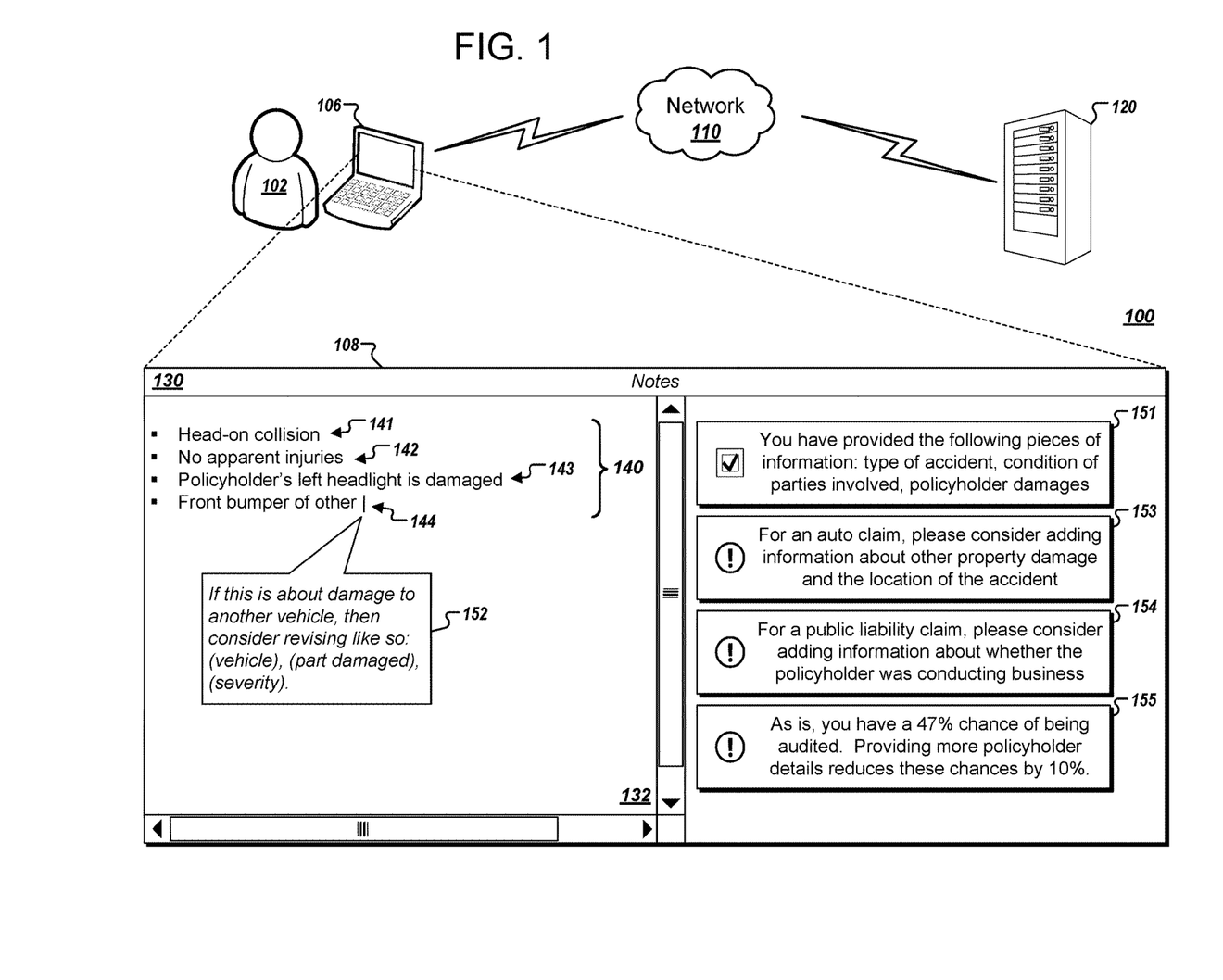
FIG. 1 is a conceptual diagram of an example framework for providing real-time guidance for content collection.

FIG. 1 is a conceptual diagram of an exemplary framework for providing real-time guidance for content collection in a system 100. More particularly, the diagram depicts a client device 106 in communication with a computing device 120 over a network 110, that collectively make up the system 100. The diagram also depicts a user interface 108, which is a presentation that is displayed by a screen of the client device 106 at a particular time. Briefly, and as described in further detail below, the client device 106 may receive input from a user 102 and in response, display the user interface 108.

The user interface 108 is a part of an application installed on the client device 106, e.g., a word processing application. The user 102 can enter unstructured text 140 into text box 132 of the user interface 108 of a word processing application 130. In this example, the user 102 is an insurance agent who is taking notes about an automobile accident involving an automobile insurance policyholder as the user 102 obtains details of the automobile accident. For instance, the user 102 may be entering the unstructured text 140 while assisting the automobile insurance policyholder in the wake of the automobile accident. The unstructured text 140 may, for instance, represent input provided by the user 102 to the user interface of word processing application 130 by way of one or more text entry interfaces including virtual keyboards, mechanical keyboards, speech recognition systems, voice recognition systems, gesture recognition systems, handwriting recognition systems, or a combination thereof.

As the user 102 interacts with word processing application 130, the client device 106 captures the contents of text box 132 and provides the captured contents to a content collection guidance system. The content collection guidance system can be executed locally by the client device 106 or remotely by the computing device 120.

The content collection guidance system evaluates the contents of text box 132 and can provide real-time content collection guidance for display on the client device 106 to assist the user 102 in meeting objectives of their interaction with word processing application 130. In this context, "real-time" means that the content collection guidance is displayed automatically while the user types and before receiving any user submission actions, e.g., pressing the Enter key or selecting a "Submit" button or other similar user interface element. Generally, the content collection guidance is presented as quickly as the processing limitations of the system allow—in other words, whenever a suggestion becomes available and without any intentional delay.

As described in more detail below, the content collection guidance system provides real-time content collection guidance to the user 102 that individually and collectively indicate how the user 102 can enter text to most effectively or efficiently complete a task. In other words, the content collection guidance serves suggestions for data elements the user should enter next in order to complete a particular objective.

To do so, the content collection guidance system leverages statistical models that indicate the contextual meaning of portions of the unstructured text 140, at least one task that the user 102 intends to accomplish by interacting with text box 132, and additional actions that need to be taken by the user 102 in order to complete the task.

When the client device 106 displays the user interface 108 as depicted in FIG. 1, the unstructured text 140 represents text entered so far by the user 102, which reads, "Head-on collision . . . No apparent injuries . . . Policyholder's left headlight is damaged . . . Front bumper of other." The content collection guidance system receives the unstructured text 140 and uses one or more statistical models to generate suggestions that are provided as content collection guidance to the user 102. In some examples, the one or more statistical models may be generated, maintained, and modified using one or more machine learning techniques, such as supervised learning, unsupervised learning, and reinforcement learning. For example, the one or more statistical models may include artificial neural network and logistic regression models.

The content collection guidance system uses the one or more statistical models to map or correlate attributes of the unstructured text 140 and historical records of unstructured text having been previously entered by the user 102 and others, to attributes of one or more intended tasks. The statistical techniques leveraged to determine such attributes of one or more intended tasks may include classification analysis, regression analysis, and clustering analysis. The content collection guidance system may maintain or otherwise access the one or more statistical models.

A first model that the content collection guidance system can use is a data element recognition model. The data element recognition model determines the contextual meaning of portions of the unstructured text 140. That is, the data element recognition model may be used to recognize or otherwise identify data elements occurring within the unstructured text 140, such as distinct words and phrases, and determine their respective contextual meanings. The data element recognition model may be trained using training examples containing unstructured text previously entered by users that are labeled with data elements occurring in the unstructured text. In the example of FIG. 1, the data element recognition model may indicate that the unstructured text 140 contains data elements 141-144, which correspond text that says "Head-on collision," "No apparent injuries," "Policyholder's left headlight is damaged," and "Front bumper of other," respectively.

The contextual meanings of data elements 141-144, as indicated through use of the data element recognition model, may be presented within the user interface of word processing application 130 so as to inform the user 102 of the progress of their composition. In the example of FIG. 1, user element 151 is presented within the user interface of word processing application 130 to indicate to the user 102 that the "type of accident," "condition of parties involved," and "policyholder damages," as associated with data elements 141-143, respectively, are data elements that occur in the unstructured text 140.

A second model that the content collection guidance system can use is a task recognition model. The task recognition model uses data elements occurring in the unstructured text 140 to determine one or more tasks that the user 102 intends to perform by interacting with text box 132. For instance, the task recognition model may be trained using historical records of labeled with one or more data elements that have been entered for one or more intended tasks. In this way, the task recognition model may be used to recognize or otherwise identify one or more tasks that the user 102 intends to accomplish according to the data elements that have been entered. In the example of FIG. 1, the task recognition model may indicate that the user 102 most likely intends to produce an automobile insurance claim according to the recognized data elements occurring in the unstructured text 140.

For instance, the task recognition model may indicate that the occurrence of data elements 141-144 in the unstructured text 140 indicates that an automobile insurance claim is the user's most likely intended task. The data produced in association with the task recognition model may be incorporated into user interface elements suggesting that the user 102 revise portions of the unstructured text 140 in accordance with the one or more intended tasks. In the example of FIG. 1, user element 152 is presented within the user interface of word processing application 130 to suggest that, in the event that data element 144 currently being edited by the user 102 relates to damages sustained to another vehicle involved in the automobile accident, the user 102 revise data element 144 to include more details associated with automobile insurance claims.

A third model that the content collection guidance system can use is a data element gap recognition model. The data element gap recognition model generates a prediction of one or more data elements not found within unstructured text 140. The data element gap recognition model can be trained using training examples labeled with present and absent data elements for a particular intended task. The predicted data elements produced in association with the data element gap recognition model may be incorporated into user interface elements suggesting that the user 102 provide the one or more data elements not found.

In the example of FIG. 1, user element 153 is presented within the user interface of word processing application 130 to suggest that, for an automobile insurance claim, the user 102 add data elements to the unstructured text 140 relating to other property damage and the location of the accident. The user element 153 incorporates data produced in association with the data element recognition, task recognition, and data element gap recognition models. Other user elements may serve to provide the user 102 with guidance relating to one or more tasks beyond those of the automobile insurance claim. For instance, user interface element 154 is presented within the user interface of word processing application 130 to suggest that, for a public liability claim, the user 102 add data elements to the unstructured text 140 relating to whether the policyholder was conducting business at the time of the incident. In this example, the task recognition model may have indicated one or more tasks associated with public liability claims as being the second most relevant to the unstructured data 140.

A fourth model that the content collection guidance system can use is a task prediction model. The task prediction model generates predictions about how best to complete one or more intended tasks. In particular, the task prediction model may be used to determine which of the one or more data elements not found within the unstructured text 140, if added to the unstructured text 140 by the user 102, would most positively impact the user 102's progress toward successfully completing the one or more intended tasks. In other words, the task prediction model may indicate how critical each of the absent data elements is for the user 102 to document data for the intended task.

The data produced in association with the task prediction model may be leveraged to rank or otherwise assign priority to the suggested data elements obtained by way of the data element gap recognition model, and may also be incorporated into user interface elements that present the user 102 with one or more insights about their current and anticipated performance. In the example of FIG. 1, user interface element 155 is presented within the user interface of word processing application 130 to inform the user 102 that, as it stands, the automobile insurance claim being prepared by the user 102 has a 47% of being audited. The user interface element 155 also suggests that the user 102 add data elements to the unstructured text 140 relating to policyholder details. For example, the task prediction model may have been used to recognize that certain policyholder details, e.g., first name, last name, etc., are missing from the unstructured text 140, and determine, using historical records of unstructured text, that 47% of automobile insurance claims omitting these policyholder details are ultimately audited.

With the information obtained through use of the one or more statistical models, various user interface elements may be generated and provided for display on the client device 106. As demonstrated by elements 151-155 of FIG. 1, the user interface elements may be provided so as to augment the user interface of application 130 with suggestions and other information pertaining to the content and status of the unstructured text 140. The user interface elements include graphical control elements that may be presented within the user interface of application 130, within a panel provided alongside the user interface of application 130, within a widget, as an overlay to the user interface of application 130, external to the application 130 or the client device 106, or a combination thereof.

In some implementations, the client device 106 is a mobile computing device, personal digital assistant, cellular telephone, smart-phone, laptop, desktop, workstation, and other computing device. The client device 106 accesses the network 110 using a wireless connection, such as a cellular telephone data connection, a Wi-Fi connection, or other wireless connection that can be used for sending data to and receiving data from the computing device 120.

In some implementations, the network 110 includes one or more networks, such as a local area network, a wide area network, and/or the Internet. One or more of the networks in the network 110 may be wireless, such as a cellular telephone network or a Wi-Fi network. The content collection guidance system described in association with FIG. 1 may rely upon one or more remotely-located devices such as servers, databases, cloud computing devices, or a combination thereof, to perform at least a portion of its functions as described herein.

Figure 2:
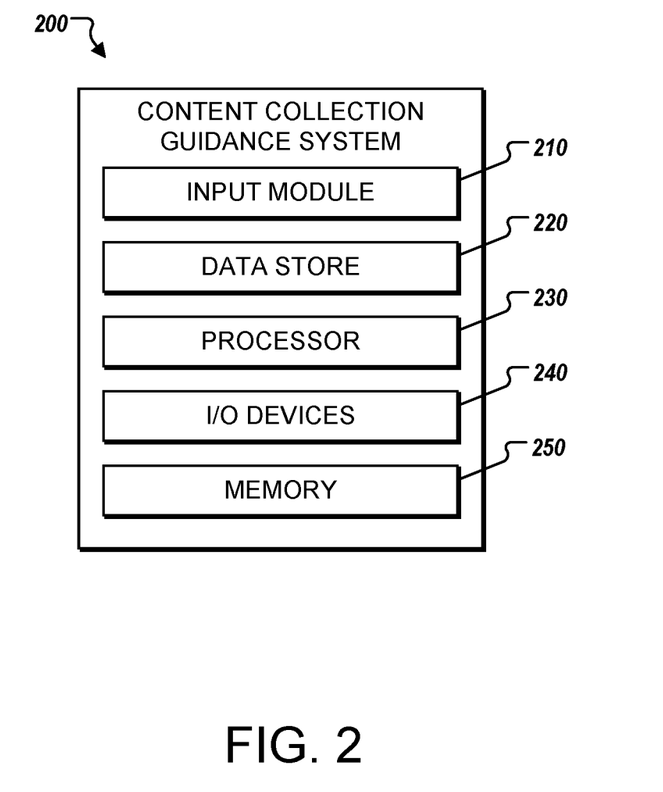
FIGS. 2-3 are diagrams of example systems for providing real-time guidance for content collection.

FIG. 2 illustrates an exemplary content collection guidance system 200 for providing real-time guidance for content collection. The system 200 includes an input module 210, a data store 220, one or more processors 230, one or more I/O (Input/Output) devices 240, and memory 250. The input module 220 may be used to input any type of information accepted by a real-time content collection guidance process leveraged by the system 200. For example, the input module 210 may be used to receive, for example, data obtained and maintained in association with the one or more statistical models, unstructured text, and historical records of unstructured text. In some implementations, data from the input module 210 is stored in the data store 220. The data included in the data store 220 may include, for example, data obtained and maintained in association with the one or more statistical models, unstructured text, and historical records of unstructured text, and all other data described above in reference to FIGS. 1 and 3-5.

In some examples, the data store 220 may be a relational database that logically organizes data into a series of database tables. Each database table in the data store 220 may arrange data in a series of columns (where each column represents an attribute of the data stored in the database) and rows (where each row represents attribute values). In some implementations, the data store 220 may be an object-oriented database that logically or physically organizes data into a series of objects. Each object may be associated with a series of attribute values. In some examples, the data store 220 may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The processor 230 may be a processor suitable for the execution of a computer program such as a general or special purpose microprocessor, and any one or more processors of any kind of digital computer. In some implementations, the system 200 includes more than one processor 230. The processor 230 may receive instructions and data from the memory 250. The memory 250 may store instructions and data corresponding to any or all of the components of the system 200. The memory 250 may include read-only memory, random-access memory, or both.

The I/O devices 240 are configured to provide input to and output from the system 200. For example, the I/O devices 240 may include a mouse, a keyboard, a stylus, or any other device that allows the input of data. The I/O devices 240 may also include a display, a printer, or any other device that outputs data.

Figure 3:
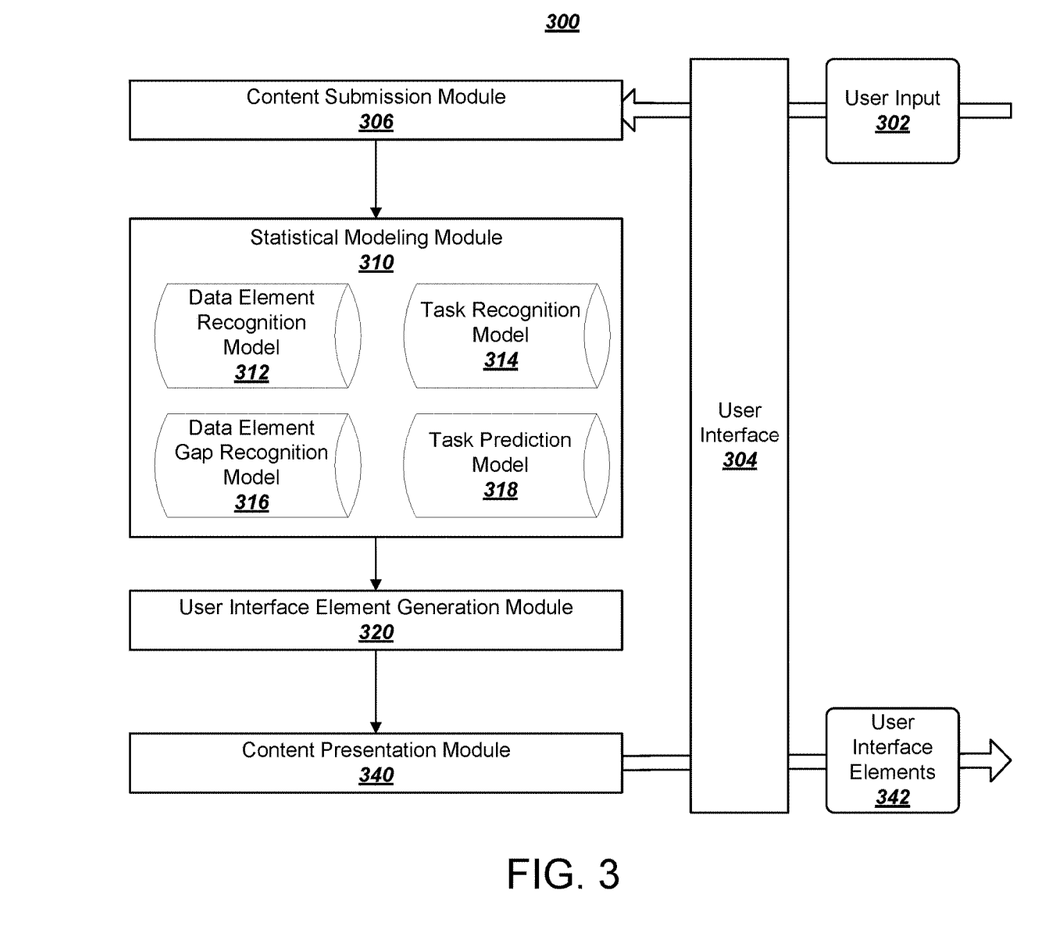

FIG. 3 depicts an exemplary system 300 for providing real-time guidance for content collection. More particularly, system 300 includes user interface 304, content submission module 306, statistical modeling module 310, user interface element generation module 320, and content presentation module 340. Although depicted as a singular system, the architecture of system 300 may be implemented using one or more networked computing devices, such as client device 106 and computing device 120. In some implementations, system 300 may be utilized to execute the processes described above in association with FIG. 1.

The user interface 304 may be a module that receives, as input, user input 302 and provides, as output, user interface elements 342. User interface 304 may be that of a user interface presentation or graphical user interface provided in association with a word processing application, such as application 130 described above, or other application with text entry functionality that is running on a client device. In this example, user input 302 may be text that is representative of input provided by a user of the application, and user interface elements 342 may include data element suggestions and other feedback that is rendered to the user of the application through user interface 304. The user input 302 is provided, as input, to content submission module 306, and that user interface elements 342 are provided, as output, from content presentation module 340 in real-time in response to user input 302. In some implementations, content submission module 306 and content presentation module 340 may also correspond to functionality of the application. A variety of additional inputs and outputs may be provided through user interface 304.

In the example depicted in FIG. 3, the content submission module 306 receives user input 302 through user interface 306. User input 302 may represent the entirety of the contents of a text box or other text entry field, or may represent only the most recent portion of such contents as provided by a user. The content submission module 306 may receive user input 302 and, in real-time, provide such contents to the statistical modeling module 310. In some implementations, the content submission module 306 may only do so in response to determining that the contents of the text box or other text entry field have changed at all or undergone a threshold amount of change. The content submission module 306 may also process user input 302 that is received so as to format user input 302 for input to statistical modeling module 310. In some implementations, the content submission module 306 may also correspond to functionality of an application. In such implementations, the content submission module 306 may communicate with the statistical modeling module 310 over one or more networks, such as those described above in association with FIG. 1.

The statistical modeling module 310 receives the content represented by user input 302, as provided by content submission module 306. The statistical modeling module 320 may leverage statistical models 312-318 or other inferential processes to determine, with a degree of confidence, that (i) the content represented by user input 302 most likely includes a first set of one or more data elements, (ii) the first set of one or more data elements have most likely been provided as part of an effort to complete one or more particular intended tasks, (iii) the content represented by user input 302 most likely excludes a second, different set of one or more particular data elements, and (iv) a portion of the second set of one or more data elements must be or are recommended to be provided as part of the effort to complete the one or more particular intended tasks. Upon making these determinations, the statistical modeling module 310 may provide data indicating the results of one or more of these determinations to the user interface element generation module 320. That is, the statistical modeling module 310 may output data that indicates the first set of data elements, the one or more particular intended tasks, the second set of data elements, the portion of the second set of one or more data elements must be or are recommended to be provided as part of the effort to complete the one or more particular intended tasks, as well as one or more confidence values that indicate the statistical modeling module's confidence that such output data appropriately classifies and provides guidance for the given user input 302.

Statistical models 312, 314, 316, and 318 may correspond to the data element recognition, task recognition, data element gap recognition, and task prediction models described above in association with FIG. 1, respectively. In one general aspect, statistical models 312, 314, 316, and 318 may be trained using historical records of unstructured text previously entered by the user of the application associated with user interface 302 and others that can be labeled with various attributes of the unstructured text. Statistical models 312-318 may be independently or jointly trained using one or more machine learning techniques. In implementations in which one or more of statistical models 312-318 are artificial neural networks, one or more backpropagation training techniques may be used.

More particularly, the data element recognition model 312 may provide one or more of the functions described above with reference to the data element recognition model, and may be used to determine that (i) the content represented by user input 302 most likely includes a first set of one or more data elements. The statistical modeling module 310 may apply the contents received from the content submission module 306 directly to the data element recognition model 312.

The data element recognition model 312 can be trained using historical records of unstructured text that was previously entered by the user of the application associated with user interface 302 or by others. Specifically, the historical records that are used to train the data element recognition model 312 can be labeled with different data elements that occur within each historical record. The metadata may further associate each tagged or labeled data element with a contextual meaning. Following the example provided above in association with FIG. 1, the data element recognition model 312 may indicate the phrase "Head-on collision," included in the unstructured text 140, as being a distinct data element pertaining to a "type of accident," because it was trained using historical records in which phrases such as "T-bone collision," "Collided head-on," and "Head-on car crash," were tagged or labeled as pertaining to a "type of accident." In this way, the data element recognition model 312 may be used to map or correlate one or more attributes of distinct words or phrases conveyed in user input 302, to one or more attributes of distinct data elements having respective contextual meaning. The data element recognition model 312 may be further used to recognize multiple different possible data element configurations for a single word or phrase within given unstructured text, and indicate a level of confidence that each possible data element configuration accurate classifies such word or phrase.

The task recognition model 314 can be used to determine that the first set of one or more data elements have most likely been provided as part of an effort to complete one or more particular intended tasks. The statistical modeling module 310 may apply the results of the determination made using the data element recognition model 312 directly to the task recognition model 314.

The task recognition model 314 can be trained using training examples that indicate data elements previously entered by users and one or more corresponding intended tasks.

Following the example provided above in association with FIG. 1, the task recognition module 314 can receive the data elements as output by the data element recognition model 312 to determine that the unstructured text 140 represents an automobile insurance claim. The training data may indicate that data elements pertaining to a "type of accident," "condition of parties involved," and "policyholder damages," are typically related to automobile insurance claims. In this way, the task recognition model 314 may be used to map or correlate one or more data elements identified through the user of the data element recognition module 312, to one or more distinct tasks. The task recognition model 314 may be further used to recognize multiple different possible sets of one or more intended tasks for the same given unstructured text, and indicate a level of confidence that each possible set of one or more intended tasks appropriately represent what the user of the application associated with user interface 304 intends to accomplish by providing user input 302.

The data element gap recognition model 316 can be used to determine that the content represented by user input 302 most likely excludes one or more other data elements. The statistical modeling module 310 may apply the results of the determination made using the task recognition model 314, directly to the data element gap recognition model 316.

The data element gap recognition model 316 can be trained using training examples labeled with present data elements and absent data elements. The system can then train the model to generate a prediction of which data elements users most commonly leave out when entering data elements for one or more intended tasks. In other words, the data element gap recognition model 316 can output a likelihood that a particular data element will be omitted by the user for a particular intended task.

Following the example provided above in association with FIG. 1, the data element gap recognition model 316 can indicate that for the intended task of an automobile insurance claim, users most commonly leave out "other property damage" and "location of the accident." In some implementations, the system can also filter the output of the data element gap recognition model 316 to exclude data elements that the user has actually already entered, e.g., as output by the data element recognition model 312.

In some implementations, the system can perform a set difference to generate a set of absent data elements. In other words, the system can determine, from data elements that are present for an intended task, one or more data elements that are required for the task but that do not yet occur in the user input.

In addition, the system can also rank data elements according to the output of the data element gap recognition model 316. The system can then designate only a highest-ranking subset of data elements as data elements to be suggested to the user. In other words, the system performs a set difference to determine an initial set of absent data elements, and then ranks the absent data elements according to how commonly users do not include such data elements. The system can use the ranking to generate a subset of absent data elements that are most commonly omitted.

The task prediction model 318 can be used to determine a ranking of one or more absent data elements. Then, the system can identify the highest-ranked data elements, which are data elements that are most likely to be useful or required for completing the intended tasks. The statistical modeling module 310 may rank the output of the data element gap recognition model 316 by using the task prediction model 318.

The task prediction model 318 can be trained using training examples that indicate how adding one data element to a set of existing data elements changes the quality or accuracy of a prediction for a particular task. For example, the training examples can indicate how adding one or more data elements affects downstream processes related respectively to one or more tasks that use the data elements entered by the user. In other words, the training examples indicate what is likely to occur after a particular set of data elements have been submitted.

To generate the training data, the system can repeatedly augment initial sets of data elements with an additional data element and measure impact on downstream processes. For example, the system can provide a first set of data elements to a downstream process to generate a first indication of accuracy or quality, e.g., to a process that predicts audit risk. The system can then augment the first set of data elements with another data element and provide the augmented set of data elements to the same process to compute an updated indication of accuracy or quality. The training example then includes the data element that was added and is labeled with the difference between the two indications.

After being trained, the task prediction model 318 can provide a score or rank for a particular data element for a particular task, where the score indicates how much better the quality or accuracy of the particular task will be if the data element is added. Following the example provided above in association with FIG. 1, the task prediction model 318 may suggest that a data element pertaining to "other property damage" be added to the unstructured text 140, because it was trained using one or more historical records that were tagged or labeled as being automobile insurance claims that included this data element, and, as a result, were associated with a relatively high level of accuracy or quality, as well as one or more historical records that were tagged or labeled as being automobile insurance claims that did not include this data element, and, as a result, were associated with a relatively low level of accuracy or quality.

The quality of a score generated by the task prediction model 318 can represent the likelihood of the particular task having a particular desirable or undesirable outcome. For example, the score can represent how likely it is for the work of the user to be audited based on whether or not the user inputs the data element. Such undesirable outcomes can include instances in which the user's submission is later audited, reopened, deemed incomplete or insufficient, or considered to have violated one or more organization rules. In some implementations, each event may be associated with a level of severity, as defined by a user or through the use of one or more machine learning processes. That is, data elements that mitigate risk of the occurrence of events associated with relatively high levels of severity may be ranked higher than those that mitigate risk of the occurrence of events associated with relatively low levels of severity. In this way, the statistical modeling module 310 may be able to determine which data elements it is most imperative that the user of the application associated with user interface 304 add to their composition.

The statistical modeling module 310 provides results from some or all of the modeling techniques described above as input to the user interface element generation module 320. Beyond the results described above, the statistical modeling module 310 may use statistical models 312-318 to indicate one or more other attributes of the unstructured text corresponding to user input 302. For instance, the statistical modeling module 310 may further output information about the likely format of the unstructured text corresponding to user input 302 and likely characteristics of the user of the application associated with user interface 302, such as occupation, level of experience, track record of task completion, personal interests, and the like.

The user interface element generation module 320 may evaluate the data it receives from the statistical modeling module 310 against a set of rules to determine whether the user interface 304 is to be augmented with one or more user interface elements to suggest that the user of the application associated with user interface 304 provide one or more additional data elements. In response to determining that the user interface 304 is to be augmented with one or more user interface elements to suggest that the user of the application associated with user interface 304 provide one or more additional data elements, the user interface element generation module 310 may further select, from among the data elements not included in the given unstructured text as identified by way of the data element gap recognition model 316, a particular set of the one or more data elements not included in the given unstructured text that are to be suggested to the user of the application associated with user interface 304. The user interface element generation module 310 may further generate, for each of the particular set of one or more data elements, one or more user interface elements suggesting that the user of the application associated with user interface 304 update the unstructured text of their composition to include the respective data element.

In some implementations, the user interface element generation module 320 may determine whether the user interface 304 is to be augmented with one or more user interface elements, based on one or more confidence values output by the statistical modeling module 310 that indicate levels of confidence in the statistical significance of the results obtained through the use of some or all of statistical models 312-318. For instance, the user interface 304 may not be augmented with one or more additional user interface elements until the user has provided information of sufficient quantity and/or specificity such that one or more confidence values output by the statistical modeling module 310 satisfy one or more threshold values. These techniques may serve to prevent the user from being bombarded with unnecessary and unhelpful suggestions.

The user interface element generation module 320 may further select a particular set of one or more data elements not included in the given unstructured text as identified by way of the data element gap recognition model 316, based at least on the scores determined through use of the task prediction model 318 and for the one or more data elements identified by way of the data gap recognition model 316. In some examples, the user interface element generation module 320 may determine to generate user interface elements suggesting that the user of the application associated with user interface 304 update the unstructured text of their composition to include the top-ranking data elements. For instance, the user interface element generation module 320 may select data elements that fall within a predetermined top percentage of rankings provided by way of the task prediction model 318, or may select a predetermined quantity of the top-ranked data elements. As described above, the one or more data elements not included in the given unstructured text as identified by way of the data element gap recognition model 316 may be ranked on the basis of scores determined for such data elements by way of the task prediction model 318. The user interface element generation module 320 proceed to generate one or more user interface elements suggesting that the user provide the one or more selected data elements.

For instance, the user interface element generation module 320 may generate user interface elements that are similar to user interface elements 151-155 as described above in association with FIG. 1, and each communicate information pertaining to one or more of the selected data elements. In addition, the user interface element generation module 320 may also generate user interface elements that communicate information pertaining to one or more data elements that are included in the given unstructured text as identified by way of the data element recognition model 312, one or more intended tasks as determined by way of the task recognition model 314, or a combination thereof.

In one general aspect, the user interface element generation module 320 may generate user interface elements that communicate information provided in the results obtained by way of the data element recognition model 312, the task recognition model 314, the data element gap recognition model 316, the task prediction model 318, or a combination thereof. In some implementations, the user interface element generation module 320 may leverage one or more templates when generating user interface elements. For example, such templates may have one or more dynamic portions that are to be populated with specific pieces of information obtained from the statistical modeling module 310.

In some implementations, the user interface element generation module 320 may incorporate other pieces of information into the user interface elements, such as information about the user of the application associated with user interface 304, one or more values calculated or otherwise determined based on results provided by the statistical modeling module 310, information obtained from one or more Internet resources, or a combination thereof. The user interface elements generated by the user interface element generation module 320 may include graphical control elements, such as widgets, pop-up notifications, side panel notifications, comments, modal windows, dialog boxes, and other graphics overlaying or presented alongside the application associated with user interface 304. The user interface element generation module 320 may further indicate the particular location at which each user interface element is to be presented on the user interface 304.

The user interface element generation module 320 provides information representative of updates that are to be applied to the presentation of user interface 304 as input to the content presentation module 340. The content presentation module 340 may receive input from the user interface element generation module 320 and, in real-time, update the presentation of user interface 304 accordingly. In some implementations, the content presentation module 340 may only do so in response to determining that the input provided by user interface element generation module 340 signals any change to the presentation of user interface 304 or signals a change to the presentation of user interface 304 that exceeds a threshold amount of change. The content presentation module 340 may also process information that is received from user interface element generation module 340 so as to format such information into an update that is compliant with user interface 304 and, when provided to user interface 304, augments the presentation of user interface 304 with user interface elements 342 as specified by user interface element generation module 320. In some implementations, the content presentation module 340 may also correspond to functionality of an application. In such implementations, the content presentation module 340 may communicate with the user interface element generation module 340 over one or more networks, such as those described above in association with FIG. 1.

Although described within the context of insurance claims, the principles of the techniques described in association with FIGS. 1-3 may be applied to a variety of other contexts. For example, such content collection guidance techniques may be leveraged to enhance user experience associated with drafting and submitting crime reports, customer service complaints, reports of offensive content published through a social networking service, office actions, shipping inquiries, help desk tickets, and the like.

The principles of these techniques may be applied as part of or an extension to an application running on one or more computing devices. Such applications may include any application having word processing functionality, such as email applications, word processor applications, browsers, messaging applications, cloud-based word processing applications, web applets, social networking applications, and the like. Furthermore, the suggested data elements and other indicia described herein may be conveyed to users in a variety of ways. That is, in addition to conveying such information to users by way of user interface elements that are provided for display through the user interface that the user is currently interacting with, such information may be conveyed in the form of audible feedback, notifications provided to other services and/or devices associated with the user, e.g., SMS messages, mobile push notifications, email messages, etc., haptic feedback, and the like.

Figure 4:
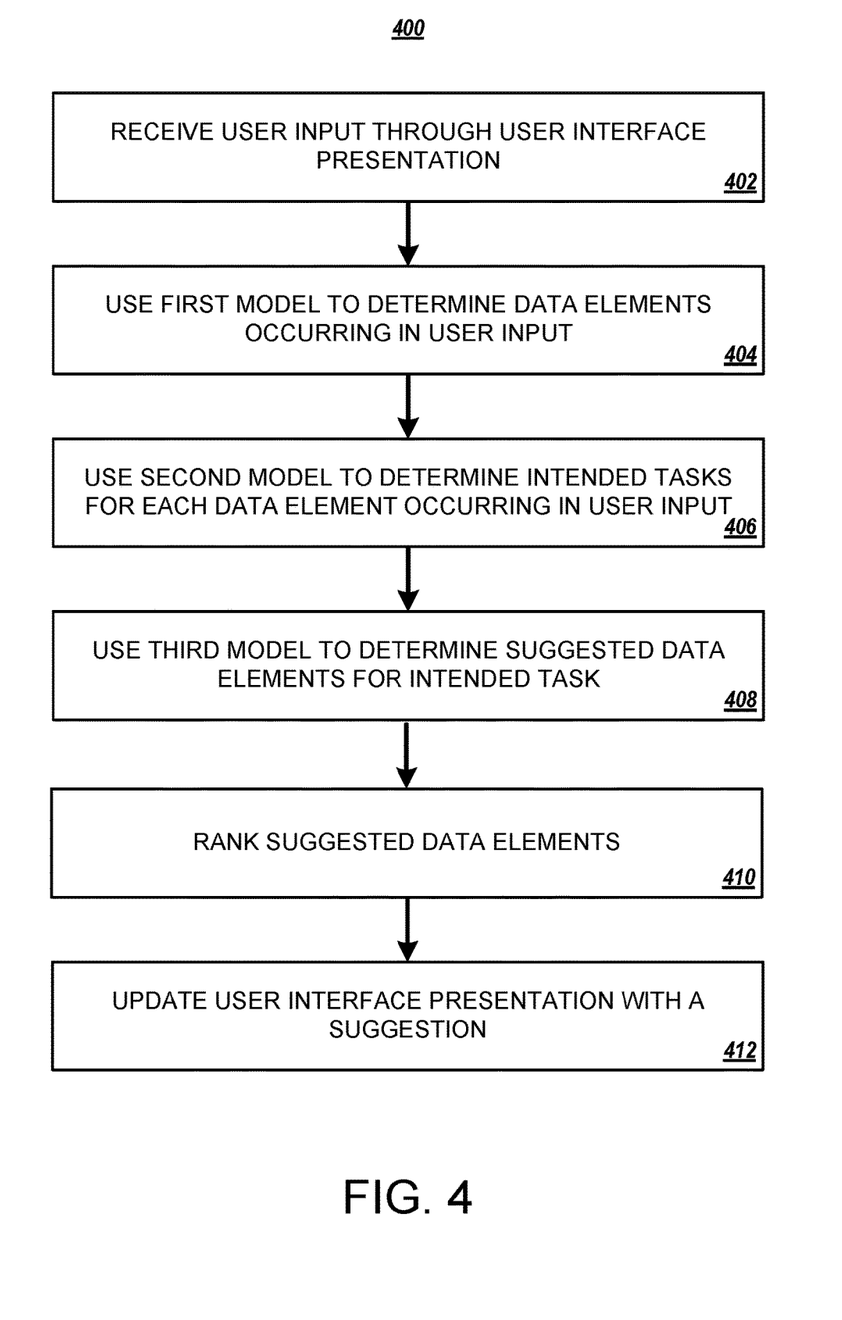
FIG. 4 is a flowchart of an example process for providing real-time guidance for content collection.

FIG. 4 illustrates exemplary process 400 for providing real-time guidance for content collection. The following describes the process 400 as being performed by components of systems that are described with reference to FIGS.

1-3. However, the process 400 may be performed by other systems or system configurations. Briefly, the process 400 may include receiving user input from a user through a user interface presentation (402), determining, from the received user input using a first model, one or more provided data elements occurring in the user input (404), determining, from the one or more provided data elements occurring in the user input using a second model, one or more intended tasks (406), determining, for each intended task of the one or more intended tasks using a third model, one or more suggested data elements (408), ranking the one or more suggested data elements (410), and updating the user interface presentation with a user interface element suggesting that the user provide the one or more needed data elements (412).

In more detail, the process 400 may include receiving user input from a user through a user interface presentation (402). For example, this may correspond to content submission module 306 receiving user input 302 through the presentation of user interface 304. Such user input may represent at least a portion of freeform text, such as that which is similar to the unstructured text 140 described above in association with FIG. 1, and may include multiple terns, such as words or phrases. The user input may include unstructured text received through a text box of the user interface presentation, voice input received through a voice recognition system, and the like.

The process 400 may include determining, from the received user input using a first model, one or more provided data elements occurring in the user input (404). This may, for instance, correspond to the statistical modeling module 310 applying user input 302 to the data element recognition model 312 to recognize data elements within given unstructured text, such as those similar to data elements 141-144 as identified within the unstructured text 140 described above in association with FIG. 1.

The process 400 may include determining, from the one or more provided data elements occurring in the user input using a second model, one or more intended tasks (406). For example, this may correspond to the statistical modeling module 310 applying results obtained using the data element recognition model 312 to the task recognition model 314 to recognize one or more intended tasks corresponding to the data elements recognized by way of the data element recognition model 312. Each task may be associated with a respective set of one or more data elements for completing the task, and may be identified from among multiple different tasks. Such tasks may, for instance, include those similar to the task of completing an automobile insurance claim or the task of completing a public liability claim as described above in association with FIG. 1.

The process 400 may include determining, for each intended task of the one or more intended tasks using a third model, one or more suggested data elements (408). This may, for instance, correspond to the statistical modeling module 310 applying results obtained using the task recognition model 314 to the data element gap recognition model 316 to recognize one or more data elements not occurring in unstructured text corresponding to user input 302.

The process 400 may include ranking the one or more suggested data elements (410). For example, this may correspond to the statistical modeling module 310 applying results obtained using the data element gap recognition model 316 to the task prediction model 318 to rank the one or more data elements not occurring in unstructured text corresponding to user input 302.

The process 400 may include updating the user interface presentation with a user interface element suggesting that the user provide the one or more needed data elements (412). This may, for instance, correspond to the presentation of user interface 304 being updated by way of user interface element generation module 320 and content presentation module 320. Such updates may be provided based on some or all of the results output by statistical modeling module 310. In some examples, the updating may be performed without receiving a user submission action. For instance, updates to the presentation of the user interface may be provided in real-time while the user is entering freeform text within a word processing application. In this way, guidance may be provided to the user on-the-fly, rather than through a formal submission process.

In some implementations, the process 400 further includes determining, for each suggested data element, a likelihood that the suggested data element will be omitted by the user for the one or more intended tasks. In such implementations, the system can rank the one or more suggested data elements according to the likelihood that they will be omitted.

In some examples, the process 400 further includes determining, from the one or more intended tasks using a fourth model, a score that represents a measure of accuracy or quality of an intended task if the suggested data element is added. This may, for instance, correspond to the statistical modeling module 310 applying results obtained using the data element gap recognition model 316 to the task prediction model 318 to predict the likelihood that one or more events, such as an audit or reopening of the documentation currently being drafted by the user, will occur following submission of the documentation or completion of the one or more intended tasks. In such examples, the confidence value that reflects the level of confidence that the user input represents accurate or complete information may be relied upon to rank the one or more suggested data elements. In some implementations, the process 400 also includes determining, for each suggested data element using the fourth model, a score that indicates a degree to which the level of confidence would change upon occurrence of the suggested data element in the user input. For example, this may also correspond to the statistical modeling module 310 applying results obtained using the data element gap recognition model 316 to the task prediction model 318 to determine a score or ranking for each of the data elements identified by way of the data element gap recognition model 316. In such implementations, the scores determined for the one or more suggested data elements may be relied upon to rank the one or more suggested data elements.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising: receiving user input from a user through a user interface presentation, the user input comprising a plurality of terms; determining, from the received user input using a first model, one or more provided data elements occurring in the user input; determining, from the one or more provided data elements occurring in the user input using a second model, one or more intended tasks of a plurality of tasks, wherein each task is associated with a respective plurality of data elements for completing the task; determining, for each intended task of the one or more intended tasks using a third model, one or more suggested data elements, wherein the suggested data elements are data elements not occurring in the one or more provided data elements occurring in the user input; ranking the one or more suggested data elements; and updating the user interface presentation with a user interface element suggesting that the user provide the one or more suggested data elements.

Embodiment 2 is the method of embodiment 1, wherein updating the user interface presentation comprises updating the user interface presentation without receiving a user submission action.

Embodiment 3 is the method of any one of embodiments 1-2, wherein receiving user input from the user through a user interface presentation comprises receiving unstructured text through a text box of the user interface presentation.

Embodiment 4 is the method of any one of embodiments 1-3, wherein receiving user input from the user through a user interface presentation comprises receiving voice input from the user.

Embodiment 5 is the method of any one of embodiments 1-4, wherein ranking the one or more suggested data elements comprises: determining, for each suggested data element, a likelihood that the suggested data element will be omitted by the user for the one or more intended tasks; and ranking the one or more suggested data elements according to the likelihood that the suggested data element will be omitted by the user for the one or more intended tasks.

Embodiment 6 is the method of any one of embodiments 1-5, wherein ranking the one or more suggested data elements comprises: determining, for each suggested data element using a fourth model, a score that represents a measure of accuracy or quality of an intended task if the suggested data element is added; and ranking the one or more suggested data elements according to the measure of accuracy or quality of the intended task.

Embodiment 7 is the method of embodiment 6, further comprising: obtaining training examples that indicate, for a particular data element and a particular task, a change in a measure of accuracy or quality of the intended task if the particular data element is used to perform the intended task; and training the fourth model using the obtained training examples.

Embodiment 8 is the method of any one of embodiments 6-7, wherein the score represents a likelihood of an intended task having particular outcome.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
  receiving user input from a user through a user interface, the user input comprising a plurality of terms;
  determining, by providing the user input as input to a first model, one or more data elements in the user input and one or more data element labels that each describe a respective data element, wherein each data element includes one or more terms of the plurality of terms;
  determining, from among a plurality of tasks and by providing the one or more data elements and the one or more data element labels that each describe a respective data element as input to a second model, one or more predicted tasks for the provided user input, wherein each task of the plurality of tasks is associated with a respective plurality of data elements and data element labels of each data element for completing the task;
  determining, by providing each task of the one or more tasks as input to a third model, one or more additional data elements for one or more suggested data element labels that are not included in the one or more data elements in the user input, wherein each additional data element for each suggested data element label includes additional information that is for completing the task and that has not yet entered been entered;
  and
  updating the user interface with a user interface element suggesting that the user provide the one or more additional data elements.

2. The method of claim 1, wherein updating the user interface presentation comprises updating the user interface presentation without receiving a user submission action.

3. The method of claim 1, wherein receiving user input from the user through a user interface comprises receiving unstructured text through a text box of the user interface.

4. The method of claim 1, wherein receiving user input from the user through a user interface comprises receiving voice input from the user.

5. The method of claim 1, further comprising:
ranking the one or more suggested data elements
wherein the user interface element includes the ranking of each suggested data element, and
wherein ranking the one or more suggested data elements comprises:
determining, for each suggested data element, a likelihood that the suggested data element will be omitted by the user for the one or more predicted tasks; and
ranking the one or more suggested data elements according to the likelihood that the suggested data element will be omitted by the user for the one or more predicted tasks.

6. The method of claim 5, wherein ranking the one or more suggested data elements comprises:
determining, by providing each suggested data element as input to a fourth model, a score that represents a measure of accuracy or quality of predicted task if the suggested data element is added; and
ranking the one or more suggested data elements according to the measure of accuracy or quality of the predicted task.

7. The method of claim 6, further comprising:
obtaining training examples that indicate, for a particular data element and a particular task, a change in a measure of accuracy or quality of the predicted task if the particular data element is used to perform the predicted task; and
training the fourth model using the obtained training examples.

8. The method of claim 6, wherein the score represents a likelihood of a predicted task having a particular outcome.

9. A system comprising:
one or more computers and one or more storage devices storing instructions that are operable, when executed by the one or more computers, to cause the one or more computers to perform operations comprising:
receiving user input from a user through a user interface, the user input comprising a plurality of terms;
determining, by providing the user input as input to a first model, one or more data elements in the user input and one or more data element labels that each describe a respective data element, wherein each data element includes one or more terms of the plurality of terms;
determining, from among a plurality of tasks and by providing the one or more data elements and the one or more data element labels that each describe a respective data element as input to a second model, one or more predicted tasks for the provided user input, wherein each task of the plurality of tasks is associated with a respective plurality of data elements and data element labels of each data element for completing the task;
determining, by providing each task of the one or more tasks as input to a third model, one or more additional data elements for one or more suggested data element labels that are not included in the one or more data elements in the user input, wherein each additional data element for each suggested data element label includes additional information that is for completing the task and that has not yet entered been entered;
and
updating the user interface with a user interface element suggesting that the user provide the one or more additional data elements.

10. The system of claim 9, wherein updating the user interface presentation comprises updating the user interface presentation without receiving a user submission action.

11. The system of claim 9, wherein receiving user input from the user through a user interface comprises receiving unstructured text through a text box of the user interface.

12. The system of claim 9, wherein receiving user input from the user through a user interface comprises receiving voice input from the user.

13. The system of claim 9, further comprising:
ranking the one or more suggested data elements
wherein the user interface element includes the ranking of each suggested data element, and
wherein ranking the one or more suggested data elements comprises:
determining, for each suggested data element, a likelihood that the suggested data element will be omitted by the user for the one or more predicted tasks; and
ranking the one or more suggested data elements according to the likelihood that the suggested data element will be omitted by the user for the one or more predicted tasks.

14. The system of claim 13, wherein ranking the one or more suggested data elements comprises:
determining, by providing each suggested data element as input to a fourth model, a score that represents a measure of accuracy or quality of predicted task if the suggested data element is added; and
ranking the one or more suggested data elements according to the measure of accuracy or quality of the predicted task.

15. The system of claim 14, wherein the operations further comprise:
obtaining training examples that indicate, for a particular data element and a particular task, a change in a measure of accuracy or quality of the predicted task if the particular data element is used to perform the predicted task; and
training the fourth model using the obtained training examples.

16. The system of claim 14, wherein the score represents a likelihood of a predicted task having a particular outcome.

17. A computer program product, encoded on one or more non-transitory computer storage media, comprising instructions that when executed by one or more computers cause the one or more computers to perform operations comprising:
receiving user input from a user through a user interface, the user input comprising a plurality of terms;
determining, by providing the user input as input to a first model, one or more data elements in the user input and one or more data element labels that each describe a respective data element, wherein each data element includes one or more terms of the plurality of terms;
determining, from among a plurality of tasks and by providing the one or more data elements and the one or more data element labels that each describe a respective data element as input to a second model, one or more predicted tasks for the provided user input, wherein each task of the plurality of tasks is associated with a respective plurality of data elements and data element labels of each data element for completing the task;
determining, by providing each task of the one or more tasks as input to a third model, one or more additional data elements for one or more suggested data element labels that are not included in the one or more data elements in the user input, wherein each additional data element for each suggested data element label includes additional information that is for completing the task and that has not yet entered been entered; and updating the user interface with a user interface element suggesting that the user provide the one or more additional data elements.

18. The computer program product of claim 17, wherein updating the user interface presentation comprises updating the user interface presentation without receiving a user submission action.

19. The computer program product of claim 17, wherein receiving user input from the user through a user interface comprises receiving unstructured text through a text box of the user interface.

20. The computer program product of claim 17, wherein receiving user input from the user through a user interface comprises receiving voice input from the user.

21. The computer program product of claim 17, further comprising:
ranking the one or more suggested data elements
wherein the user interface element includes the ranking of each suggested data element, and
wherein ranking the one or more suggested data elements comprises:
determining, for each suggested data element, a likelihood that the suggested data element will be omitted by the user for the one or more predicted tasks; and
ranking the one or more suggested data elements according to the likelihood that the suggested data element will be omitted by the user for the one or more predicted tasks.

22. The computer program product of claim 21, wherein ranking the one or more suggested data elements comprises:
determining, by providing each suggested data element as input to a fourth model, a score that represents a measure of accuracy or quality of predicted task if the suggested data element is added; and
ranking the one or more suggested data elements according to the measure of accuracy or quality of the predicted task.

23. The computer program product of claim 22, wherein the operations further comprise:
obtaining training examples that indicate, for a particular data element and a particular task, a change in a measure of accuracy or quality of the predicted task if the particular data element is used to perform the predicted task; and
training the fourth model using the obtained training examples.

24. The computer program product of claim 22, wherein the score represents a likelihood of a predicted task having a particular outcome.

* * * * *